US012449857B2

(12) United States Patent
Yang et al.

(10) Patent No.: US 12,449,857 B2
(45) Date of Patent: Oct. 21, 2025

(54) REPLACEABLE ELECTRONIC DEVICE PROTECTING CASING

(71) Applicants: Sampson Yang, Irvine, CA (US); Yun-Chang Tsui, Taipei (TW); Wei-Chung Wang, Taipei (TW)

(72) Inventors: Sampson Yang, Irvine, CA (US); Yun-Chang Tsui, Taipei (TW); Wei-Chung Wang, Taipei (TW)

(73) Assignee: The Joy Factory Inc., Irvine, CA (US)

( * ) Notice: Subject to any disclaimer, the term of this patent is extended or adjusted under 35 U.S.C. 154(b) by 331 days.

(21) Appl. No.: 18/220,261

(22) Filed: Jul. 10, 2023

(65) Prior Publication Data

US 2025/0021134 A1    Jan. 16, 2025

(51) Int. Cl.
*G06F 1/16* (2006.01)
*A45C 11/00* (2006.01)
*H05K 5/06* (2006.01)

(52) U.S. Cl.
CPC ............ *G06F 1/1656* (2013.01); *A45C 11/00* (2013.01); *G06F 1/1626* (2013.01); *H05K 5/061* (2013.01); *A45C 11/002* (2025.01); *A45C 11/003* (2025.01); *G06F 2200/1633* (2013.01)

(58) Field of Classification Search
CPC ................. G06F 1/1656; G06F 1/1626; G06F 1/1628–1629; A45C 11/002; A45C 11/003
See application file for complete search history.

(56) References Cited

U.S. PATENT DOCUMENTS

| | | | | |
|---|---|---|---|---|
| 8,800,764 B2 * | 8/2014 | Wu | ...................... | G06F 1/1626 |
| | | | | 455/575.8 |
| 8,955,678 B2 * | 2/2015 | Murphy | ............... | H04B 1/3888 |
| | | | | 206/320 |
| 9,462,099 B2 * | 10/2016 | Wilson | .................. | H04M 1/185 |
| 10,993,335 B1 * | 4/2021 | Tsui | .......................... | H05K 5/03 |
| 11,314,280 B2 * | 4/2022 | Ferren | .................... | F16M 11/38 |
| 11,930,624 B2 * | 3/2024 | Yang | .................... | H05K 7/2039 |
| 2013/0146491 A1 * | 6/2013 | Ghali | .................... | G06F 1/1626 |
| | | | | 53/472 |

(Continued)

OTHER PUBLICATIONS

Scott Wilson + Minimal, TAKTIK: Premium Protection System for the iPhone, Oct. 6, 2014, Kickstarter, https://www.kickstarter.com/projects/1104350651/taktik-premium-protection-system-for-the-iphone (Year: 2014).*

*Primary Examiner* — Patrick F Marinelli

(57) ABSTRACT

A replaceable electronic device protecting casing includes a front covering pressure plate having an outer frame; a plurality of first screwing holes arranged around the outer frame; a transparent protective film installed in an inner side of a hollow portion of the outer frame; a plurality of second screwing holes arranged around an outer side of the transparent protective film; a waterproof strip attached on an inner side of the transparent protective film; a back seat including a seat body forming a frame body; a plurality of third screwing holes arranged around the frame body; a plurality of screwing units installed in the first screwing holes; and wherein each of the screwing units passes through a respective one first screwing hole, a respective one second screwing hole and a respective one third screwing hole to assemble the front covering pressure plate, the transparent protective film and the back seat.

12 Claims, 5 Drawing Sheets

(56) References Cited

U.S. PATENT DOCUMENTS

| | | | | |
|---|---|---|---|---|
| 2013/0220841 A1* | 8/2013 | Yang | ............... | B63C 11/02 |
| | | | | 206/37 |
| 2013/0271902 A1* | 10/2013 | Lai | ............... | H05K 5/0086 |
| | | | | 361/679.01 |
| 2014/0262847 A1* | 9/2014 | Yang | ............... | F16M 13/00 |
| | | | | 206/37 |
| 2015/0136819 A1* | 5/2015 | Yang | ............... | A45C 13/008 |
| | | | | 224/191 |
| 2015/0171912 A1* | 6/2015 | Chao | ............... | H04M 1/185 |
| | | | | 455/575.8 |
| 2015/0208535 A1* | 7/2015 | Wu | ............... | G06F 1/1656 |
| | | | | 312/223.1 |
| 2021/0232180 A1* | 7/2021 | Pakula | ............... | H04N 23/51 |
| 2023/0292467 A1* | 9/2023 | Yang | ............... | H05K 7/2039 |
| 2024/0377856 A1* | 11/2024 | Yang | ............... | H05K 7/20472 |
| 2025/0021134 A1* | 1/2025 | Yang | ............... | G06F 1/1626 |

* cited by examiner

REPLACEABLE ELECTRONIC DEVICE PROTECTING CASING

FIELD OF INVENTION

The present invention relates to accessories for an electronic device protecting casing, and in particular to a replaceable electronic device protecting casing.

BACKGROUND OF INVENTION

In prior art of tablet electronic device protective casing, the protective casing has a transparent protective film glued to an outer frame of a front covering pressure plate, and the front covering pressure plate is fixed to a back seat to form an integrated structure. A tablet electronic device (such as a tablet computer, a mobile phone, a PDA or a notebook computer) is installed between the transparent protective film and a groove of the back seat.

The above transparent protective film has a transparent structure which is aligned to a screen of the tablet electronic device so that a user can view image of the screen of the tablet electronic device through the transparent protective film. However, a main material of the transparent protective film is plastic, so it is very fragile. The transparent protective film is easy to be worn, scratched or damaged, making the protective casing unusable after a long period of use. Therefore, the entire protective casing must be discarded and replaced with a new protective casing. However, the only damaged part of the protective casing is the transparent protective film and other parts of protective casing are not damaged. In this case, it is obviously wasteful to discard the entire protective casing.

Therefore, the present invention desires to provide a novel design of the protective casing which has a replaceable transparent protective film. The transparent protective film can be replaced separately so that other parts of the protective casing can continue to be used without discarding the entire protective casing so as to save economic costs.

SUMMARY OF THE INVENTION

To improve above defects in the prior art, the present invention provides a replaceable electronic device protecting casing, wherein a transparent protective film is installed to a seat body through attaching of a waterproof strip. A plurality of screwing units (such as screws or bolts) pass through screwing holes on a front covering pressure plate, the transparent protective film and the seat body so that the front covering pressure plate, transparent protective film and seat body are assembled to each other. When the transparent protective film is damaged, a user can just remove the screwing units to disassemble the front covering pressure plate, transparent protective film and seat body, tear off the waterproof strip, and the damaged transparent protective film can be easily replaced by a new transparent protective film. Installing of the new transparent protective film can be performed by above same steps. Therefore, the entire protecting casing of the present invention will not have to be replaced due to damage of the transparent protective film.

To achieve above object, the present invention provides a replaceable electronic device protecting casing comprising a front covering pressure plate having an approximately squared outer frame; a center of the outer frame forming a hollow portion; a plurality of first screwing holes arranged around the outer frame; a transparent protective film installed in an inner side of the hollow portion; a plurality of second screwing holes arranged around an outer side of the transparent protective film and a position of each of the second screwing holes corresponding to a position of a respective one first screwing hole; a waterproof strip having an approximately shape of a shape of an outer contour of the transparent protective film; the waterproof strip being attached on an inner side of the transparent protective film; a back seat including a seat body which has a shape corresponding to a shape of the front covering pressure plate to form an approximately squared frame body; a center of the seat body forming a groove to accommodate a tablet electronic device; a plurality of third screwing holes arranged around the frame body and a position of each of the third screwing holes corresponding to a position of a respective one first screwing hole; a plurality of screwing units installed in the first screwing holes; each of the screwing units being a screw or a bolt; wherein the waterproof strip is attached on an inner side of the frame body to install the transparent protective film on the seat body; the inner side of the hollow portion is covered by the transparent protective film; wherein each of the screwing units passes through a respective one first screwing hole, a respective one second screwing hole and a respective one third screwing hole to assemble the front covering pressure plate, the transparent protective film and the back seat; and wherein the transparent protective film and the groove enclose the tablet computer.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 6, the structure of the present invention is illustrated. The present invention contains the following elements.

A front covering pressure plate 10 has an approximately squared outer frame 12. A center of the outer frame 12 forms a hollow portion 14. A plurality of first screwing holes 16 are arranged around the outer frame 12.

Figure 1:
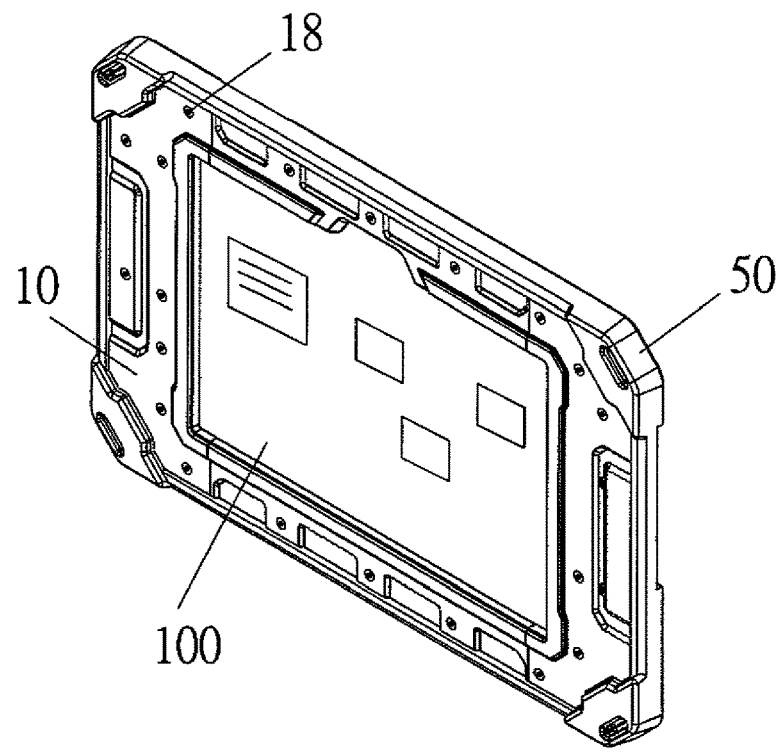
FIG. 1 is an assembly schematic view of the present invention, which is viewed from a front side.
Figure 2:
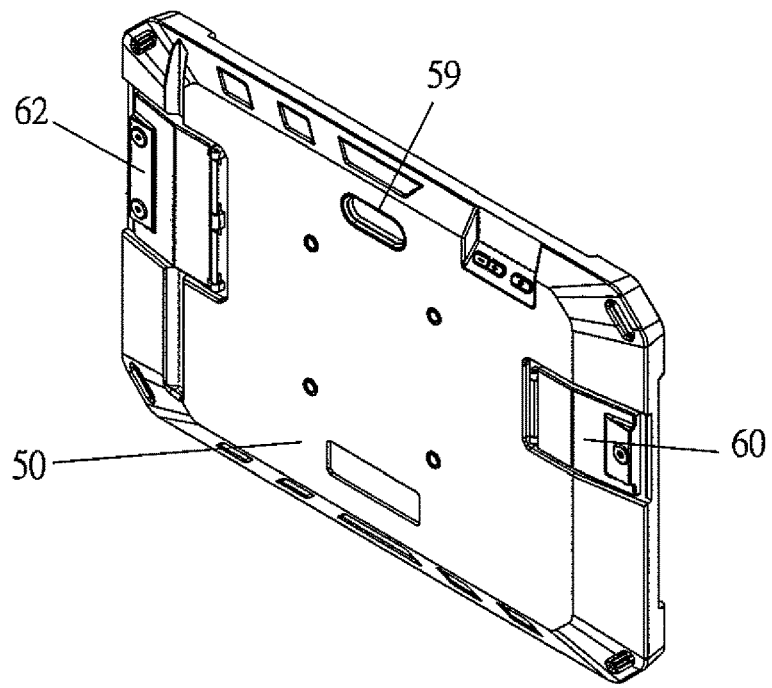
FIG. 2 is an assembly schematic view of the present invention, which is viewed from a rear side.
Figure 3:
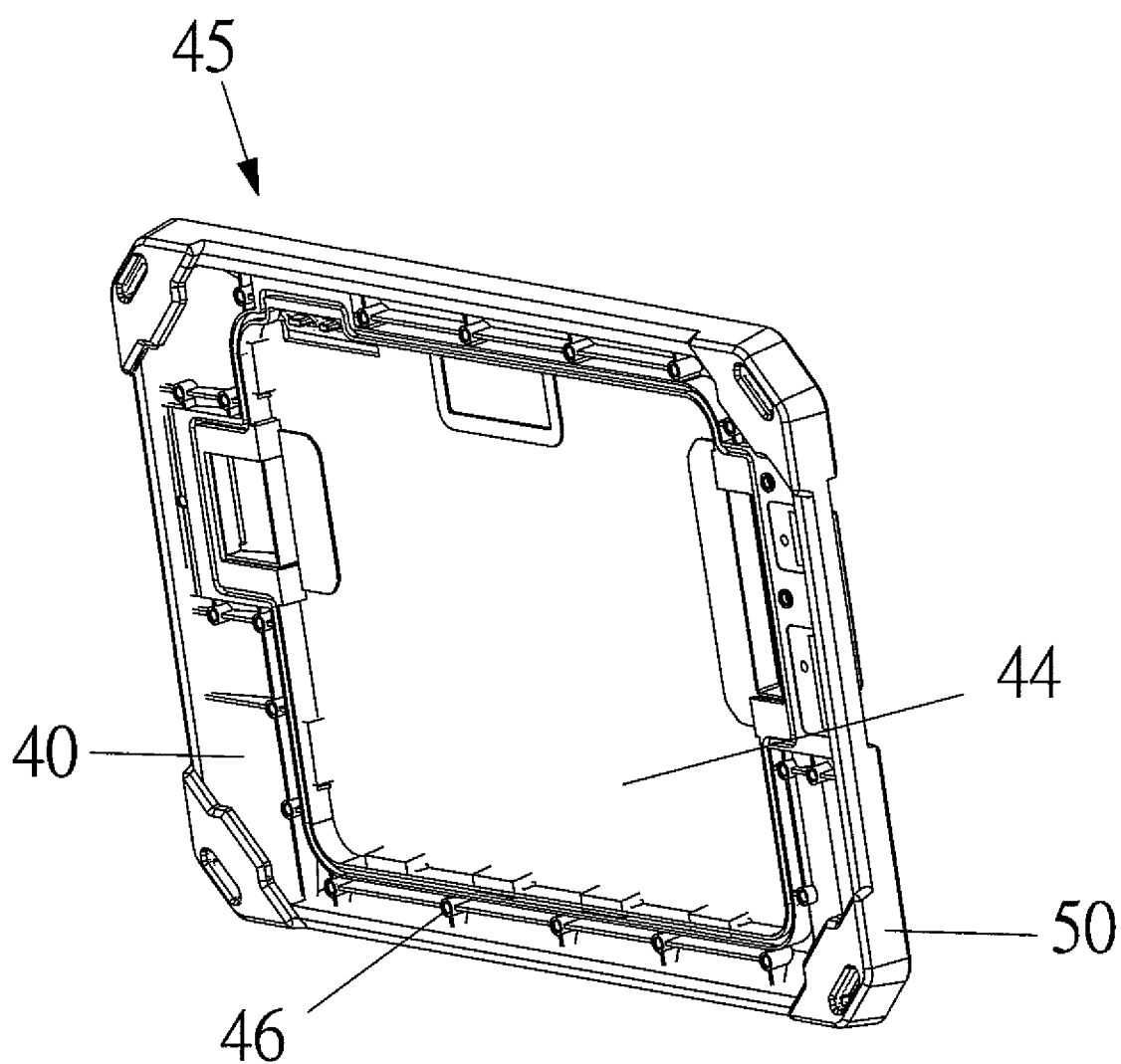
FIG. 3 is a schematic view of the back seat of the present invention.
Figure 4:
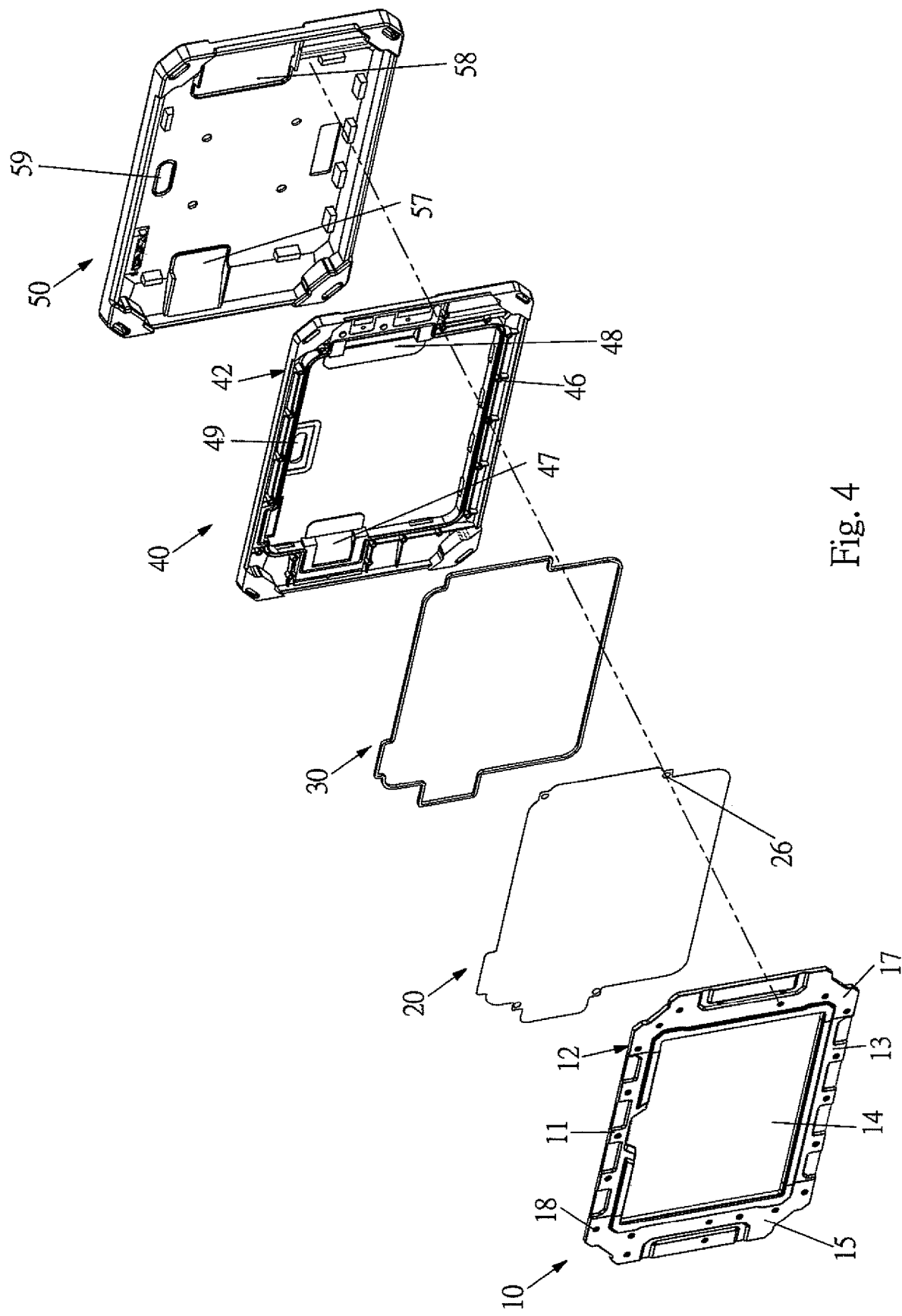
FIG. 4 is an exploded schematic view of the present invention, which is viewed from a front side.
Figure 5:
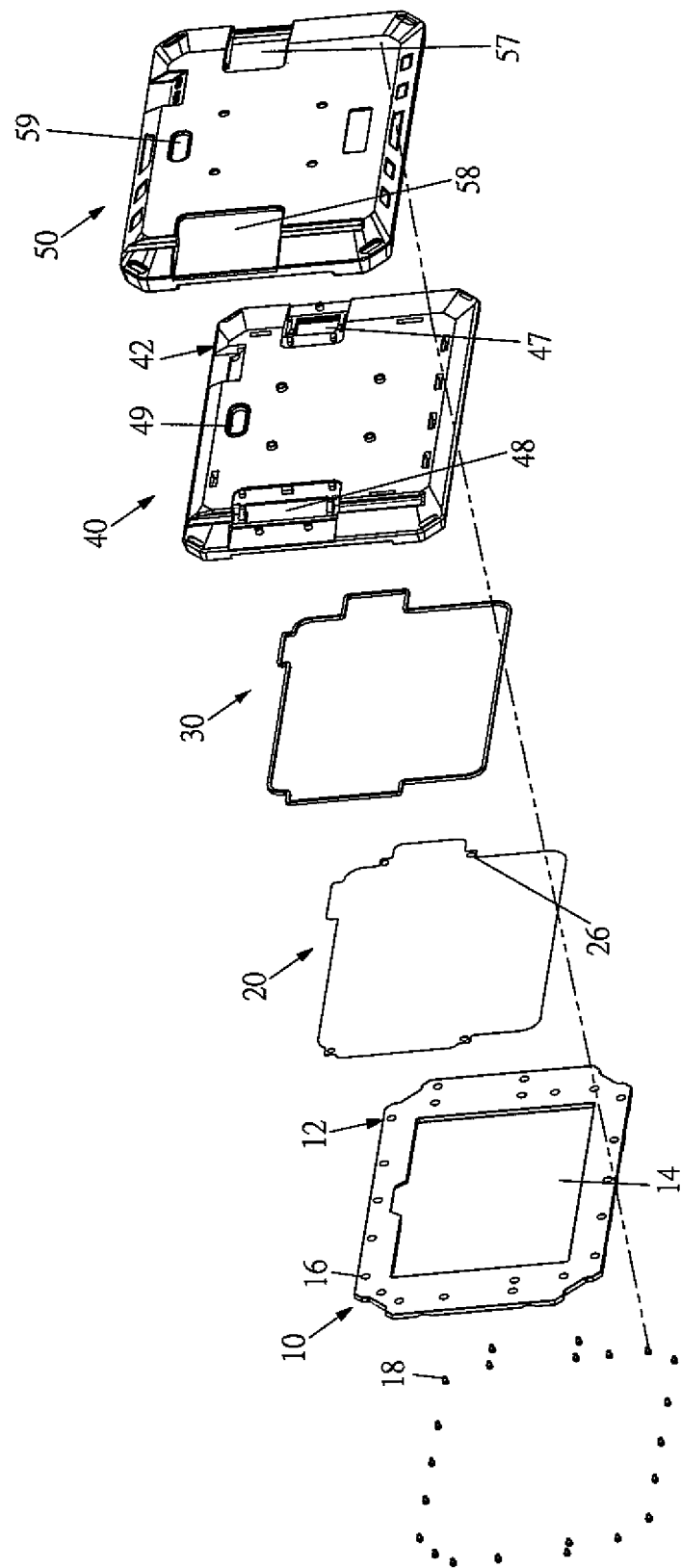
FIG. 5 is an exploded schematic view of the present invention, which is viewed from a rear side.
Figure 6:
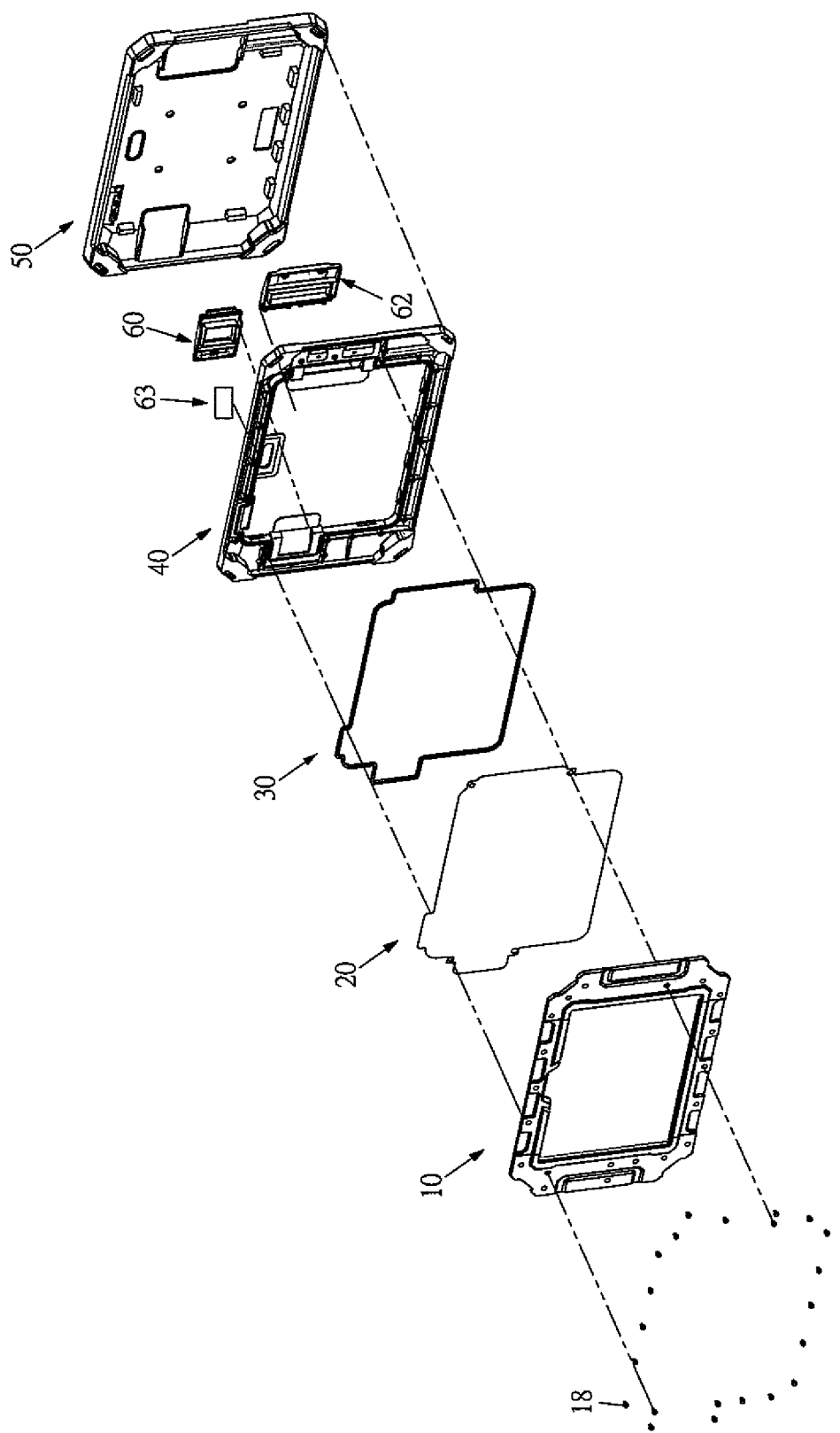
FIG. 6 is another exploded schematic view of the present invention, which is viewed from a front side.

Referring to FIG. 4, the front covering pressure plate 10 includes an upper plate 11, a left plate 15 located on an left side of the upper plate 11, a right plate 17 located on a right side of the upper plate 11, and a lower plate 13 connected between a lower end of the left plate 15 and a lower end of the right plate 17. The upper plate 11 is connected between an upper end of the left plate 15 and an upper end of the right plate 17. The upper plate 11, the left plate 15, the right plate 17 and the lower plate 13 form the outer frame 12.

A transparent protective film 20 is installed in an inner side of the hollow portion 14. A plurality of second screwing holes 26 are arranged around an outer side of the transparent protective film 20 and a position of each of the second screwing holes 26 corresponds to a position of a respective one first screwing hole 16. The transparent protective film 20 is formed by a transparent material selected from glass, PET (Polyethylene Terephthalate), PC (Polycarbonate) and acrylic.

A waterproof strip 30 has an approximately shape of a shape of an outer contour of the transparent protective film 20. The waterproof strip 30 is attached on an inner side of the transparent protective film 20.

A back seat 45 includes a seat body 40 which has a shape corresponding to a shape of the front covering pressure plate 10 to form an approximately squared frame body 42. A center of the seat body 40 forms a groove 44 to accommodate a tablet electronic device 100. A plurality of third screwing holes 46 are arranged around the frame body 42 and a position of each of the third screwing holes 46 corresponds to a position of a respective one first screwing hole 16.

The back seat 45 further includes a back cover 50 which has an approximately shape of a shape of the seat body 40 and closes a back side of the groove 44 of the frame body 42. The back cover 50 is engaged to or integrated with the seat body 40 to be fixed on the seat body 40. Preferably, the seat body 40 and the back cover 50 are assembled to each other by injection molding. The back cover 50 is used to be installed with a supporting frame to support the protecting casing or be installed with other extending device to enhance functions of the protecting casing.

The waterproof strip 30 is attached on an inner side of the frame body 42 so as to install the transparent protective film 20 on the seat body 40. The inner side of the hollow portion 14 is covered by the transparent protective film 20.

A plurality of screwing units 18 are installed in the first screwing holes 16. Each of the screwing units 18 passes through a respective one first screwing hole 16, a respective one second screwing hole 26 and a respective one third screwing hole 46 to assemble the front covering pressure plate 10, the transparent protective film 20 and the back seat 45. Each of the screwing units 18 is a screw or a bolt.

The transparent protective film 20 and the groove 44 enclose the tablet computer 100. The tablet electronic device 100 is selected from a tablet computer, a mobile phone, a PDA (personal digital assistant) and a notebook computer, etc.

The seat body 40 has a first USB through hole 47 which is positioned at a USB port of the tablet electronic device 100. The back cover 50 has a second USB through hole 57 which is positioned at the first USB through hole 47. The first USB through hole 47 and the second USB through hole 57 serve to receive an external USB device for connecting the tablet electronic device 100 to the external USB device. The first USB through hole 47 is covered by a removable USB cover 60 so as to form a dustproof structure.

The seat body 40 further has a first charging through hole 48 which is positioned at a charging port of the tablet electronic device 100. The back cover 50 has a second charging through hole 58 which is positioned at the first charging through hole 48. The first charging through hole 48 and the second charging through hole 58 serve to receive an external charging cable for connecting the tablet electronic device 100 to the external charging cable. The first charging through hole 48 is covered by a charging cover 62 so as to form a dustproof structure.

The back seat 45 is provided with the above plurality of through holes (the first USB through hole 47, the second USB through hole 57, the first charging through hole 48 and the second charging through hole 58) to receive above external components (the external USB device and the external charging cable) for connecting the tablet electronic device 100 to the external components.

The seat body 40 further has a first camera hole 49 which is positioned at a camera of the tablet electronic device 100. The back cover 50 has a second camera hole 59 which is positioned at the first camera hole 49. Pictures taking and video recording of the camera of the tablet electronic device 100 are performed through the first camera hole 49 and the second camera hole 59. A transparent film 63 closes the first camera hole 49 or the second camera hole 59 to form a dustproof structure. Material of the transparent film 63 is selected from glass, PET (Polyethylene Terephthalate), PC (Polycarbonate) and acrylic.

Advantages of the present invention are that a transparent protective film is installed to a seat body through attaching of a waterproof strip. A plurality of screwing units (such as screws or bolts) pass through screwing holes on a front covering pressure plate, the transparent protective film and the seat body so that the front covering pressure plate, transparent protective film and seat body are assembled to each other. When the transparent protective film is damaged, a user can just remove the screwing units to disassemble the front covering pressure plate, transparent protective film and seat body, tear off the waterproof strip, and the damaged transparent protective film can be easily replaced by a new transparent protective film. Installing of the new transparent protective film can be performed by above same steps. Therefore, the entire protecting casing of the present invention will not have to be replaced due to damage of the transparent protective film.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A replaceable electronic device protecting casing comprising:
a front covering pressure plate having an approximately squared outer frame; a center of the outer frame forming a hollow portion; a plurality of first screwing holes arranged around the outer frame;
a transparent protective film installed in an inner side of the hollow portion; a plurality of second screwing holes arranged around an outer side of the transparent protective film and a position of each of the second screwing holes corresponding to a position of a respective one first screwing hole;
a waterproof strip having an approximate shape of an outer contour of the transparent protective film; the waterproof strip being attached on an inner side of the transparent protective film and arranged to exclude the plurality of second screwing holes;
a back seat including a seat body which has a shape corresponding to a shape of the front covering pressure plate to form an approximately squared frame body; a center of the seat body forming a groove to accommodate a tablet electronic device; a plurality of third screwing holes arranged around the frame body and a position of each of the third screwing holes corresponding to a position of a respective one first screwing hole;

a plurality of screwing units installed in the first screwing holes; each of the screwing units being a screw or a bolt;

wherein the waterproof strip is attached on an inner side of the frame body to install the transparent protective film on the seat body; the inner side of the hollow portion is covered by the transparent protective film;

wherein each of the screwing units passes through a respective one first screwing hole, a respective one second screwing hole and a respective one third screwing hole to assemble the front covering pressure plate, the transparent protective film and the back seat; and wherein the transparent protective film and the groove enclose the tablet computer.

2. The replaceable electronic device protecting casing as claimed in claim 1, wherein the back seat further includes a back cover which has an approximately shape of a shape of the seat body and closes a back side of the groove of the frame body; and the back cover is engaged to or integrated with the seat body to be fixed on the seat body.

3. The replaceable electronic device protecting casing as claimed in claim 1, wherein the back seat is provided with a plurality of through holes to receive external components for connecting the tablet electronic device to the external components.

4. The replaceable electronic device protecting casing as claimed in claim 2, wherein the seat body has a first USB through hole which is positioned at a USB port of the tablet electronic device; the back cover has a second USB through hole which is positioned at the first USB through hole; and the first USB through hole and the second USB through hole serve to receive an external USB device for connecting the tablet electronic device to the external USB device.

5. The replaceable electronic device protecting casing as claimed in claim 4, wherein the first USB through hole is covered by a removable USB cover.

6. The replaceable electronic device protecting casing as claimed in claim 2, wherein the seat body further has a first charging through hole which is positioned at a charging port of the tablet electronic device; the back cover has a second charging through hole which is positioned at the first charging through hole; and the first charging through hole and the second charging through hole serve to receive an external charging cable for connecting the tablet electronic device to the external charging cable.

7. The replaceable electronic device protecting casing as claimed in claim 6, wherein the first charging through hole is covered by a charging cover.

8. The replaceable electronic device protecting casing as claimed in claim 2, wherein the seat body further has a first camera hole which is positioned at a camera of the tablet electronic device; the back cover has a second camera hole which is positioned at the first camera hole; and pictures taking and video recording of the camera of the tablet electronic device are performed through the first camera hole and the second camera hole.

9. The replaceable electronic device protecting casing as claimed in claim 8, further comprising a transparent film closing the first camera hole or the second camera hole.

10. The replaceable electronic device protecting casing as claimed in claim 1, wherein material of the transparent protective film is selected from glass, PET (Polyethylene Terephthalate), PC (Polycarbonate) and acrylic.

11. The replaceable electronic device protecting casing as claimed in claim 9, wherein material of the transparent film is selected from glass, PET (Polyethylene Terephthalate), PC (Polycarbonate) and acrylic.

12. The replaceable electronic device protecting casing as claimed in claim 1, wherein the front covering pressure plate includes an upper plate, a left plate located on an left side of the upper plate, a right plate located on a right side of the upper plate, and a lower plate connected between a lower end of the left plate and a lower end of the right plate; the upper plate is connected between an upper end of the left plate and an upper end of the right plate; and the upper plate, the left plate, the right plate and the lower plate form the outer frame.

* * * * *